US010215890B2

(12) United States Patent
Perreault et al.

(10) Patent No.: US 10,215,890 B2
(45) Date of Patent: Feb. 26, 2019

(54) OPTICAL FIELD CURVATURE CONTROL USING MULTI-LAYER FRESNEL LENS IN VR DISPLAY (71) Applicant: Google Inc., Mountain View, CA (US)

(72) Inventors: John D. Perreault, Mountain View, CA (US); Xinda Hu, Mountain View, CA (US); Yi Qin, Mountain View, CA (US); Serge Bierhuizen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 156 days.

(21) Appl. No.: 15/157,628

(22) Filed: May 18, 2016

(65) Prior Publication Data

US 2017/0336539 A1    Nov. 23, 2017

(51) Int. Cl.
G02B 3/08     (2006.01)
G02B 27/00    (2006.01)
G02B 27/01    (2006.01)
G02B 13/18    (2006.01)
G02B 3/04     (2006.01)
G02B 5/04     (2006.01)

(52) U.S. Cl.
CPC ............... G02B 3/08 (2013.01); G02B 3/04 (2013.01); G02B 13/18 (2013.01); G02B 27/0025 (2013.01); G02B 27/0172 (2013.01); G02B 5/045 (2013.01); G02B 2027/0132 (2013.01)

(58) Field of Classification Search
CPC ...... G02B 3/08; G02B 5/045; G02B 27/0172; G02B 27/0025

USPC .................. 359/742, 743, 618, 625–628
See application file for complete search history.

(56) References Cited

U.S. PATENT DOCUMENTS 4,936,657 A * 6/1990 Tejima .................... G02B 3/08
                                                         348/E5.141
5,559,637 A    9/1996 Moskovich
(Continued)

FOREIGN PATENT DOCUMENTS

EP       0375152 B1    3/1995
WO    2014209431 A1   12/2014

OTHER PUBLICATIONS

Delano, E., "Primary Aberrations of Fresnal Lenses", Journal of the Opitcal Society of America, vol. 64, No. 4, Apr. 1, 1974, 10 pages.
(Continued)

Primary Examiner — Evelyn A Lester (57) ABSTRACT

A lens assembly has two opposing surfaces, each surface introducing field curvature in a direction opposite of the field curvature introduced by the opposing surface, and thus the field curvatures introduced by the two surfaces at least partially cancel each other out, resulting in a net field curvature that provides for a substantially flat image plane or for an image plane with a specified curvature. The lens assembly may be implemented as a lens with two opposing Fresnel surfaces so that the field curvature in one direction introduced by one of the Fresnel surfaces is at least partially canceled out by the field curvature in the opposite direction as introduced by an opposing Fresnel surface. Alternatively, the lens assembly may be implemented as a lens with a positive continuous aspheric surface facing the user's eye and an opposing Fresnel surface facing the display panel.

22 Claims, 5 Drawing Sheets (56) References Cited

U.S. PATENT DOCUMENTS

| | | | | |
|---|---|---|---|---|
| 5,940,152 | A * | 8/1999 | Wilson | H04N 5/7441 |
| | | | | 345/5 |
| 6,031,664 | A * | 2/2000 | Goto | G03B 21/625 |
| | | | | 359/456 |
| 6,236,511 | B1 | 5/2001 | Brown | |
| 7,332,733 | B2 | 2/2008 | Jorritsma et al. | |
| 9,632,315 | B2 * | 4/2017 | Smith | G02B 3/08 |
| 2004/0141241 | A1 * | 7/2004 | Claytor | G02B 3/08 |
| | | | | 359/742 |
| 2005/0286145 | A1 * | 12/2005 | Silhengst | F21V 5/045 |
| | | | | 359/742 |
| 2007/0153402 | A1 | 7/2007 | Destain | |
| 2008/0192207 | A1 * | 8/2008 | Bocquet | G02B 3/08 |
| | | | | 353/38 |
| 2016/0109712 | A1 | 4/2016 | Harrison et al. | |

OTHER PUBLICATIONS

International Search Report and Written Opinion correlating to PCT/US2016/067141, dated May 19, 2017, 19 pages.

V.B. Yurchenko, et al., "Double-sided Split-step MM-wave Fresnel Lenses: Design, Fabrication and Focal Field Measurements", J. Europ. Opt. Soc. Rap. Public. 9, 14007 (2014), Feb. 5, 2014, pp. 14007-1 thru 14007-5.

* cited by examiner

OPTICAL FIELD CURVATURE CONTROL USING MULTI-LAYER FRESNEL LENS IN VR DISPLAY

BACKGROUND

Field of the Disclosure

The present disclosure relates generally to virtual reality displays and, more particularly, to optical lens assemblies in virtual reality displays.

Description of the Related Art

Field curvature (also known as "Petzval field curvature"), which manifests as a curved object/image plane, is one of the most predominant aberrations in imaging systems, and especially in virtual reality (VR) systems due to their generally large fields of view (FOV). The field curvature phenomenon is particularly problematic in near-eye display systems where the small pupil size of the eye results in a small numerical aperture (e.g., approximately 0.05) for a given gaze direction, and thus lower order aberrations, such as the aforementioned field curvature, dominate. Head mounted display (HMD) devices and other near-eye display systems often utilize positive asphere lenses, which cause the image display plane to curve toward the lens, regardless of which side of the lens the aspheric curvature is found. Conventionally, reduction in the field curvature introduced by such lenses is achieved either by forcing the asphere parameters in the design of the positive asphere lens to flatten the image plane or to use additional negative power optical elements to cancel out the field curvature introduced by the positive asphere lens. Either approach results in undesirable compromises in image resolution, and the use of compensatory negative power optical elements results in a thicker and heavier optical system, which can increase user discomfort when implemented in an HMD device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items. Further, the dimensions of various features in the drawings may be exaggerated relative to the dimensions of other features for purposes of illustration.

DETAILED DESCRIPTION

Positive non-Fresnel asphere lenses always introduce field curvature in the direction of the lens (that is, toward the lens). Thus, regardless of whether such lenses are oriented with the aspheric surface toward the user's eye or toward the display panel, the image plane presented through the lens curves toward the eye. However, the display panel presenting the imagery typically is flat, and this disparity between the display panel profile and the curved image plane results in out-of-focus aberrations and other field curvature-related aberrations. However, the inventors have discovered that positive aspheric Fresnel lenses (that is, Fresnel surfaces with non-zero asphere terms) operate in a different manner due to the fact that the local curvature changes with aperture position for such lenses. When the Fresnel prisms of an aspheric Fresnel lens are on the side facing the user's eye, the resulting image plane curves toward the user's eye, whereas when the Fresnel prisms are on the side facing the display panel, the resulting image plane curves toward the display panel. That is, the direction of the field curvature of a Fresnel lens is dependent on the side upon which the Fresnel prisms are found. Accordingly, as described in greater detail herein, this relationship between Fresnel prism side/orientation and direction of the introduced field curvature may be leveraged to employ a lens assembly that has two opposing surfaces, each surface introducing field curvature in a direction opposite of the field curvature introduced by the opposing surface, and thus the field curvatures introduced by the two surfaces at least partially cancel each other out, resulting in a net field curvature that provides for a substantially flat image plane, or in some embodiments, may be tailored to provide an image plane with a specified curvature (e.g., a curvature matching a curvature of a curved display panel employed in the near-eye display system). This resulting net field curvature is referred to herein as a "balanced" field curvature as it may closely align with a desired image plane curvature.

In some embodiments, this lens assembly is implemented as a lens assembly with two opposing Fresnel surfaces so that the field curvature in one direction introduced by one of the Fresnel surfaces is at least partially canceled out by the field curvature in the opposite direction as introduced by the opposing Fresnel surface. Further, the lens assembly is not limited to two opposing Fresnel surfaces, but instead may be implemented with more than two opposing Fresnel surfaces, each introducing a corresponding field curvature, and the net field curvature of the lens assembly resulting from the effective "addition" of the field curvatures of each of the Fresnel surfaces. In other embodiments, this lens assembly is implemented as a lens body with a positive continuous (that is, non-Fresnel) aspheric surface facing the user's eye and an opposing Fresnel surface facing the display panel.

Figure 1:
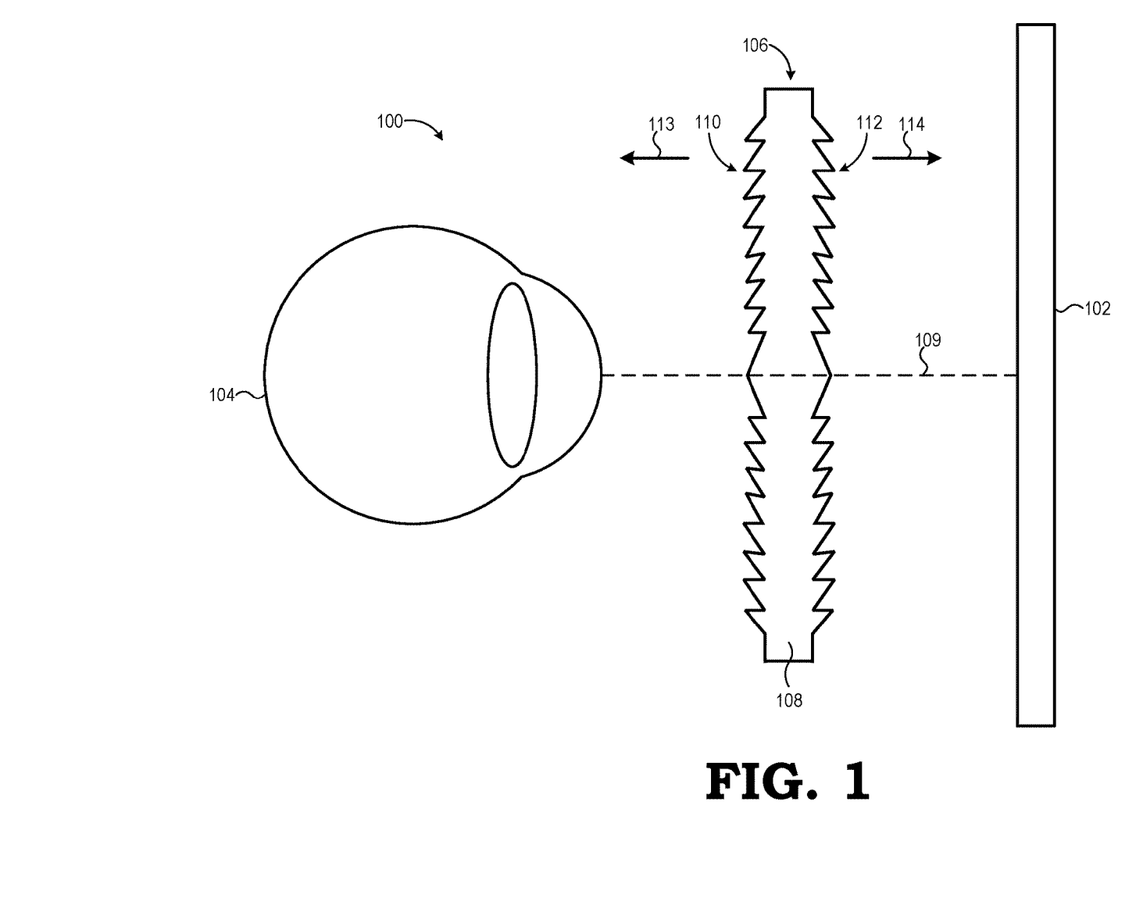
FIG. 1 is a cross-section view diagram of a near-eye display system employing a lens assembly with opposing Fresnel surfaces to provide balanced field curvature in accordance with some embodiments.

FIG. 1 illustrates a cross-section view of a near-eye display system 100 utilizing a lens assembly providing balanced field curvature in accordance with some embodiments. The near-eye display system 100 may include, for example, an HMD device, a heads-up display, and the like. The near-eye display system 100 includes at least one display panel 102 and a lens assembly 106 disposed between the display panel 102 and a user's eye 104 such that the user views the display panel 102 through the lens assembly 106. As such, any field curvature introduced by the lens assembly 106 that does not match the image plane presented by the display panel 102 typically is manifested as an increasing loss of focus away from the center of the display panel 102 (or from the point where the optical axis 109 of the lens assembly 106 intersects the display panel 102).

To counter this field curvature effect, the lens assembly 106 employs a lens body 108 having two opposing surfaces 110, 112, with surface 110 facing the user's eye and surface 112 facing the display panel 102. As depicted in FIG. 1, the surface 110 has positive aspheric Fresnel prisms disposed thereon, and oriented in a direction 113 toward the eye 104 (that is, outward from the lens body 108 toward the user's eye 104). Likewise, the surface 112 has positive aspheric Fresnel prisms formed thereon, and oriented in the opposite direction 114, that is in a direction toward the display panel 102 (that is, outward from the lens body 108 toward the display panel 102). As used herein, the term "Fresnel surface" refers to a surface or other layer of a lens having positive aspheric Fresnel prisms (also frequently referred to as Fresnel "facets") formed or otherwise disposed thereon, and thus the surfaces 110, 112 are referred to herein as "Fresnel surfaces 110, 112." The lens assembly 106 may be so formed using any of a variety of fabrication techniques. To illustrate, the lens body 108 may be composed of optical plastic or glass, and the Fresnel surfaces 110, 112 formed as part of a molding process when fabricating the lens assembly 106. Alternatively, the Fresnel surfaces 110, 112 may be formed in a plastic or glass lens blank via, for example, embossing, laser ablation, or other machining techniques. Moreover, as described in detail below with reference to FIG. 6, the lens assembly 106 may be formed by joining two separate Fresnel lenses, each having a Fresnel surface and an opposing plane surface.

Figure 2:
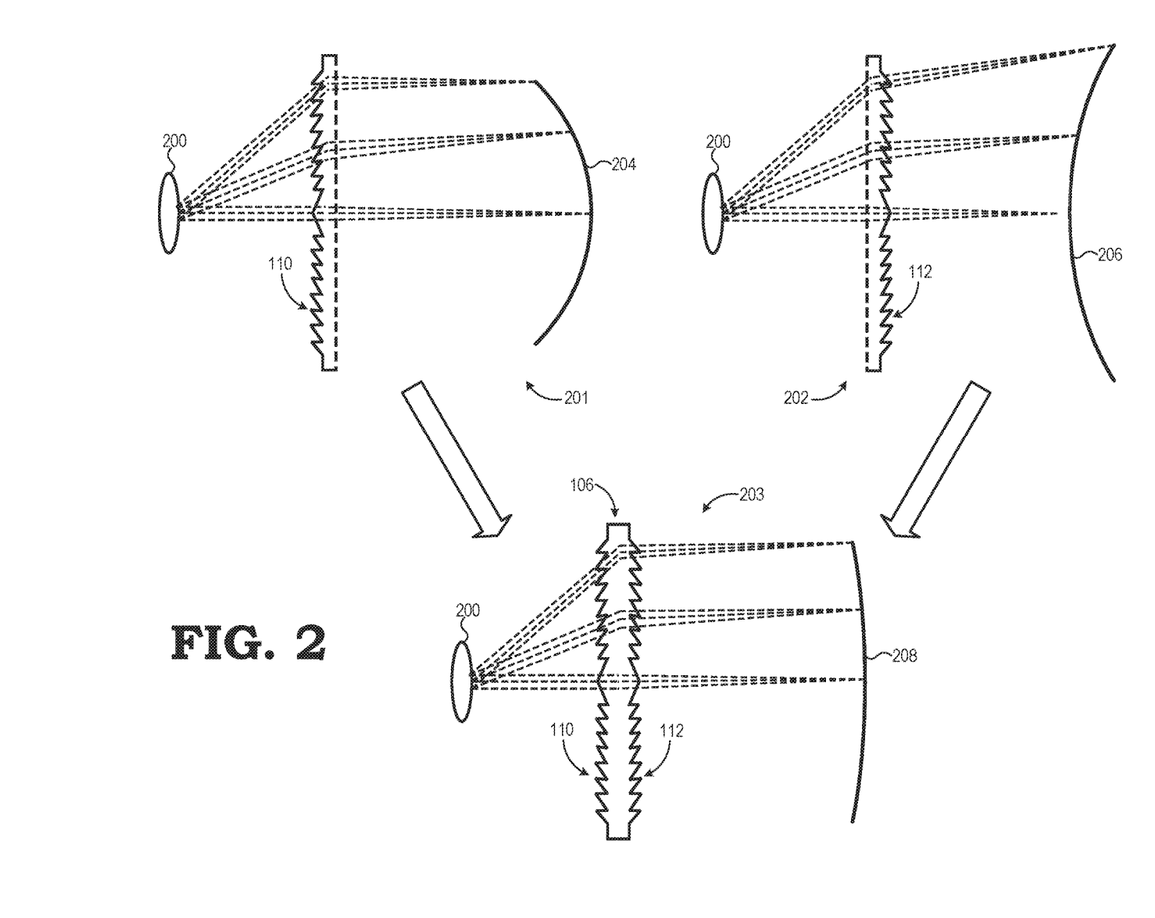
FIG. 2 is a cross-section view diagram illustrating the provision of a balanced field curvature using a lens assembly with opposing Fresnel surfaces in accordance with some embodiments.

As described above, because the Fresnel surfaces 110, 112 are opposing Fresnel surfaces, and as such, introduce field curvatures in opposite directions which at least partially cancel out and thus result in a net field curvature that is better matched to an intended image plane curvature. FIG. 2 illustrates this balanced field curvature effect in greater detail. As depicted by cross-section diagram 201, the Fresnel surface 110, having Fresnel prisms oriented toward the eye 104 (as represented by pupil 200), introduces field curvature in the direction of the eye 104 and thus results in an image plane 204 that curves toward the eye 104. Conversely, as illustrated by cross-section diagram 202, the Fresnel surface 112, having Fresnel prisms oriented toward the display panel 102, introduces field curvature in a direction away from the eye 104, and thus results in an image plane 206 that curves away from the eye 104. Consequently, as shown by cross-section diagram 203, when both Fresnel surfaces 110, 112 are implemented as opposing lens surfaces in the lens assembly 106, the field curvatures introduced by the Fresnel surfaces 110, 112 at least partially cancel each other out (as they are in opposing directions), and the net field curvature of the lens assembly 106 results in an image plane 208 with less severe curvature, and thus exhibiting reduced or eliminated focus aberrations.

Figure 3:
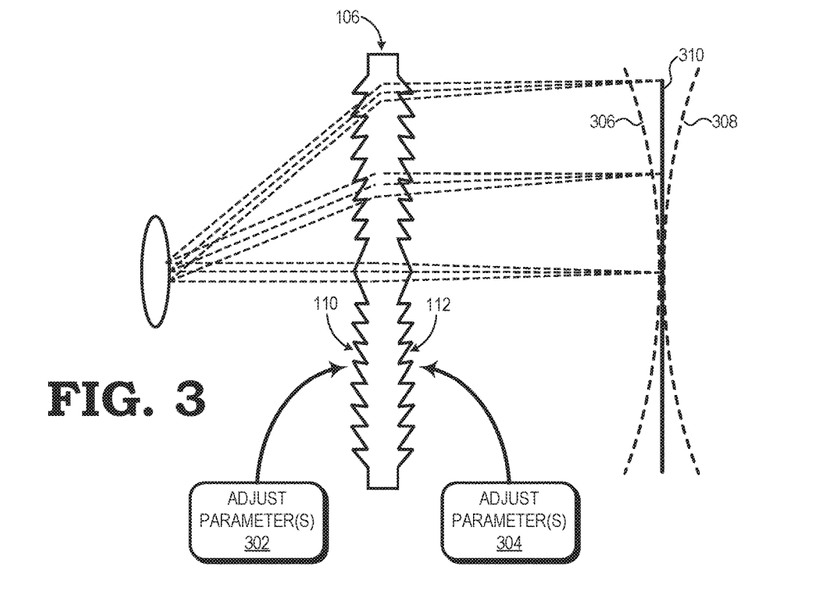
FIG. 3 is a diagram illustrating a process for adjusting the design parameters of opposing Fresnel surfaces of a lens assembly to achieve a desired net field curvature in accordance with some embodiments.

FIG. 3 illustrates an example process for designing the respective Fresnel surfaces 110, 112 of the lens assembly 106 so as to achieve a desired image plane in accordance with some embodiments. As noted above, each of the Fresnel surfaces 110, 112 introduces field curvature in a direction based on the orientation of the Fresnel surface. As such, various design parameters for each of the Fresnel surfaces 110, 112 may be determined or selected so as to achieve a certain net field curvature, which may be specified so as to closely match the curvature of the display panel 102 (or the display panel 102 may be curved to match the image plane provided by this net field curvature). That is, as shown in FIG. 3, the lens design process for designing the lens assembly 106 can include one or both of an adjust process 302 whereby one or more design parameters of the Fresnel surface 110 are adjusted or optimized to provide an expected field curvature 306 and an adjust process 304 whereby one or more design parameters of the Fresnel surface 112 are adjusted or optimized to provide an expected field curvature 308, and such that the resulting field curvatures 306, 308 at least partially cancel out or combine to result in an intended image plane 310. Note that the adjust processes 302, 304 may be performed iteratively, such that an adjustment made to one Fresnel surface may trigger readjustment to the other Fresnel surface, and so forth. Further, it will be appreciated that the superimposition of two patterned surfaces, such as the two Fresnel surfaces 110, 112, may result in Moiré effects. Accordingly, in addition to designing the parameters of the Fresnel surfaces 110, 112 to achieve a certain net field curvature, during adjust processes 302, 304 the pitch of the facets of each of the Fresnel surfaces 110, 112 may be varied independently to reduce or minimize such Moiré effects.

The adjust processes 302, 304 may be implemented by any of a variety of commercially-available or proprietary lens design optimization tools, such as the OpticStudio™ or LensMechanix™ software platforms provided by Zemax, LLC or the Code V™ software platform provided by Synopsis Inc. Such tools may adjust any of a variety of design parameters that impact the form and extent of the field curvature introduced by a Fresnel surface design. To illustrate, the field curvature of a Fresnel surface is a function of the power of the Fresnel surface, and thus the respective powers of the Fresnel surface 110, 112 may be adjusted relative to the other so that the resulting design provides a net field curvature that matches the desired image plane 310.

As another example, the curved surface height z(r) of a conventional asphere surface may be represented by the following expression:

$$z(r) = \frac{r^2}{R\left(1 + \sqrt{1 - (1+k)\frac{r^2}{R^2}}\right)} + \Sigma_n \alpha_n r^{2n}$$

where: r represents the radial aperture position, R represents the spherical radius of curvature, k represents the conic constant, and n and $\alpha_n$ represent the asphere coefficients. As a positive aspheric Fresnel lens represents a "compaction" of a conventional aspheric lens, this expression also may be used to describe parameters of the Fresnel prisms of a Fresnel surface. The parameters R and k, in particular, have an effect on the particular field curvature introduced by a Fresnel surface. Accordingly, a lens optimizer tool may vary or adjust the parameters R and k for the designs of the Fresnel surfaces 110, 112 until a suitable set of values for these parameters is identified and which results in the desired net field curvature for the image plane 310. Further, in some embodiments the lens assembly 106 is fabricated by combining two (or more) separate Fresnel lenses into a single lens body 108. As the composition of the material of a Fresnel lens may also impact the particular field curvature exhibited by that lens, to achieve a particular net field curvature different material compositions may be implemented for each Fresnel lenses so that the combined result is a net field curvature that substantially matches the desired net field curvature.

As shown by image plane 208 of FIG. 2 and image plane 310 of FIG. 3, the Fresnel surfaces 110, 112 may be designed and implemented such that the image plane resulting from the net field curvature of the lens assembly 106 may have a curved profile or substantially flat (planar) profile. The particular amount of curvature in the image plane may be designed so as to match the curvature of the display panel 102. For example, if the display panel 102 is planar, the Fresnel surfaces 110, 112 may be designed so that the net field curvature results in a substantially flat image plane, such as that shown by image plane 310 in FIG. 3. Alternatively, if the display panel 102 is curved, the Fresnel surfaces 110, 112 may be designed so that the net field curvature substantially matches the curvature of the display panel 102. However, in some implementations achieving an image plane that matches the curvature of the display panel 102 may require undesirable tradeoffs, such as reduced resolution. In such instances, a balance may be met between having a net field curvature that adequately correlates to the display panel 102, or the display panel 102 may be slightly curved to match the net field curvature produced by a particular design.

Figure 4:
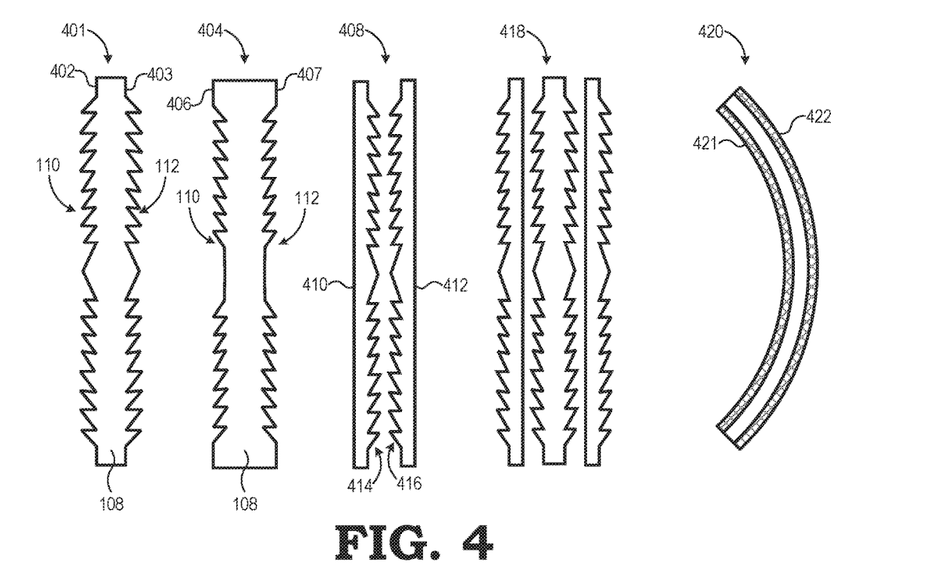
FIG. 4 is a cross-section view diagram illustrating various implementations for the lens assembly of FIG. 1 in accordance with some embodiments.

Although FIGS. 1-3 illustrate a particular example implementation of the lens assembly 106 with two Fresnel surfaces 110, 112, the lens assembly 106 is not limited to this particular example implementation. FIG. 4 illustrates various alternative example implementation aspects for the lens assembly 106. Note that aspects from different implementations may be combined in various combinations as well. As depicted by implementation 401 of FIG. 4, the implementation of FIGS. 1-3 includes an implementation of the Fresnel surfaces 110, 112 using Fresnel prisms that extend outward and away from primary surfaces 402, 403, respectively, of the lens body 108. However, as shown by implementation 404, the grooves forming the Fresnel prisms of surfaces 110, 112 alternatively may be formed so as to extend into the lens body 108 from primary surfaces 406, 407, respectively.

As another example, implementation 401 depicts a monolithic lens body 108 in which the Fresnel prisms of Fresnel surfaces 110, 112 extend away from the lens body 108. However, as illustrated by implementation 408, the lens assembly 106 instead may be implemented as two separate Fresnel lenses 410, 412, with the Fresnel lens 410 being located closer to the eye 104 (FIG. 1) and having a Fresnel surface 414 with Fresnel prisms extending inward toward the opposing Fresnel lens 412 (and toward the display panel 102), whereas the Fresnel lens 412 is closer to the display panel 102 and has a Fresnel surface 416 with Fresnel prisms extending inward toward the opposing Fresnel lens 410 (and toward the eye 104). As such, the Fresnel surface 416 constitutes the Fresnel surface 110, while the Fresnel surface 414 constitutes the Fresnel surface 112 in such an implementation.

Further, while FIGS. 1-3 illustrate examples of the lens assembly 106 in which two opposing Fresnel surfaces 110, 112 are used to obtain a balanced net field curvature, the lens assembly 106 may utilize more than two Fresnel surfaces disposed between the eye 104 and the display panel 102. To illustrate, implementation 418 of FIG. 4 depicts an example implementation whereby the lens assembly 106 comprises four Fresnel lens surfaces implemented in three Fresnel lenses, with each of the four Fresnel surfaces imparting a particular field curvature based on the orientation of the Fresnel prisms formed thereon, and the resulting four field curvatures adding or combining to provide a corresponding net field curvature.

As yet another example, rather than having a substantially planar profile, as shown by implementation 420 the lens assembly 106 alternatively may have a curved profile, and thus have a curved Fresnel surface 421 (corresponding to Fresnel surface 110) on the side facing the user eye 104, and a curved Fresnel surface 422 (corresponding to the Fresnel surface 112) on the side facing the display panel 102. A curved profile for the lens assembly 106 may be utilized, for example, to reduce or eliminate light scattering from the inactive draft face of the Fresnel prisms. The curvature of the lens assembly 106 as a whole impacts the overall net field curvature of the lens assembly 106 in that, everything else being equal, introduction of curvature in the Fresnel surfaces 110, 112 tends to introduce relatively proportional curvature in the opposite direction to the net field curvature introduced by the combination of the Fresnel surfaces 110, 112. However, this change in net field curvature due to introduction of a curve in the profile of the lens assembly 106 generally is quite small compared to the field curvature induced by the power of the Fresnel surfaces. Thus, the field curvature introduced by the curved profile of the lens assembly 106 may be compensated for by adjusting the Fresnel asphere coefficients. The curved lens assembly 106 may be fabricated to maintain the curved profile (e.g., by molding the lens body 108 using rigid material to rigidly maintain the curved profile), or the lens body 108 may be formed to be flexible and thus the lens body 108 may be mounted in a curved position so as to provide the desired curved profile.

Figure 5:
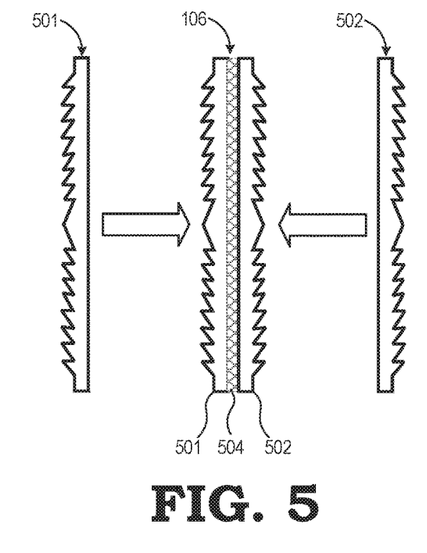
FIG. 5 is a cross-section view diagram illustrating an example method for fabricating a lens assembly with opposing Fresnel surfaces in accordance with some embodiments.

As described above, the lens assembly 106 may be fabricated by molding or machining a monolithic lens body 108 with Fresnel surfaces 110, 112 on opposing surfaces. However, this approach may have mold release issues due to the Fresnel facets on both sides of the lens body 108. Likewise, this approach typically will require that both Fresnel surfaces 110, 112 be composed of the same material or similar materials. Accordingly, as illustrated by FIG. 5, the lens assembly 106 instead may be fabricated by combining two separate Fresnel lenses 501, 502. As depicted, each of the Fresnel lenses 501, 502 has a Fresnel surface (corresponding to Fresnel surfaces 110, 112) and an opposing plano surface, and the lens assembly 106 is formed by orienting the plano surfaces of the Fresnel lenses 501, 502 to face each other in close proximity. To reduce or eliminate stray-light reflections and other unintended light refraction at the boundaries between the two plano surfaces, the Fresnel lenses 501, 502 may be joined using an optical adhesive 504. This approach permits more readily manufactured Fresnel lenses with only one Fresnel surface to be utilized, and further permits Fresnel lenses of different material compositions to be used to form the lens assembly 106, and thus allowing further design control for the particular field curvature introduced by a corresponding Fresnel surface. Moreover, while FIG. 5 depicts a combination of two Fresnel lenses, this same approach may be extended to combining more than two Fresnel lenses to provide an implementation of the lens assembly 106 with more than two opposing Fresnel surfaces. Likewise, rather than joining the two plano surfaces of the Fresnel lenses 501, 502, the Fresnel surfaces of these lenses instead may be joined together via optical adhesive or other means, resulting in the implementation 408 (FIG. 4) of the lens assembly 106 as a monolithic lens body.

Figure 6:
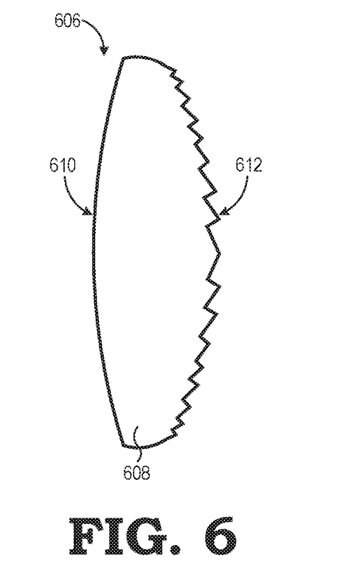
FIG. 6 is a cross-section view diagram of a lens assembly employing a positive continuous aspheric surface and an opposing Fresnel surface for balanced field curvature in accordance with some embodiments.

Although the lens assembly 106 employing two or more opposing Fresnel surfaces provides a thin, compact solution to balanced field curvature, in some implementations multiple Fresnel surfaces may be unsuitable or impracticable. For example, the use of two Fresnel surfaces, as implemented in the lens assembly 106, may lead to excessive scattering of light from the sharp edges of the facets. Accordingly, as shown in FIG. 6, the near-eye display system 100 may instead use a lens assembly 606 in place of lens assembly 106, whereby the lens assembly 606 includes a lens body 608 with opposing aspheric surfaces 610, 612, with aspheric surface 610 facing the user's eye 104 and having a conventional continuous aspheric profile, whereas aspheric surface 612 faces the display panel 102 and implements Fresnel prisms. As noted above, a continuous positive aspheric surface introduces field curvature that curves toward the lens, regardless of which side of the lens the aspheric surface is on. Thus, the aspheric surface 610 introduces a field curvature toward the eye 104. In contrast, as the Fresnel prisms of the surface 612 extend toward the display panel 102, the field curvature exhibited by the surface 612 curves in the direction of the display panel 102. Thus, the respective powers or other parameters of the surfaces 610, 612 may be selected or otherwise designed to as to achieve a desired net field curvature, as similarly described above.

The implementation of the lens assembly 606 may provide certain advantages over the lens assembly 106 in some circumstances. For one, by using the continuous aspheric surface 610, some of the refractive power of the lens assembly 606 is induced by this curved surface, and thus less power is required from the opposing Fresnel surface 612. Further, by reducing total Fresnel area compared to an implementation with two Fresnel surfaces, the lens assembly 606 generally will exhibit less light scattering compared to a comparable implementation of the lens assembly 106

Figure 7:
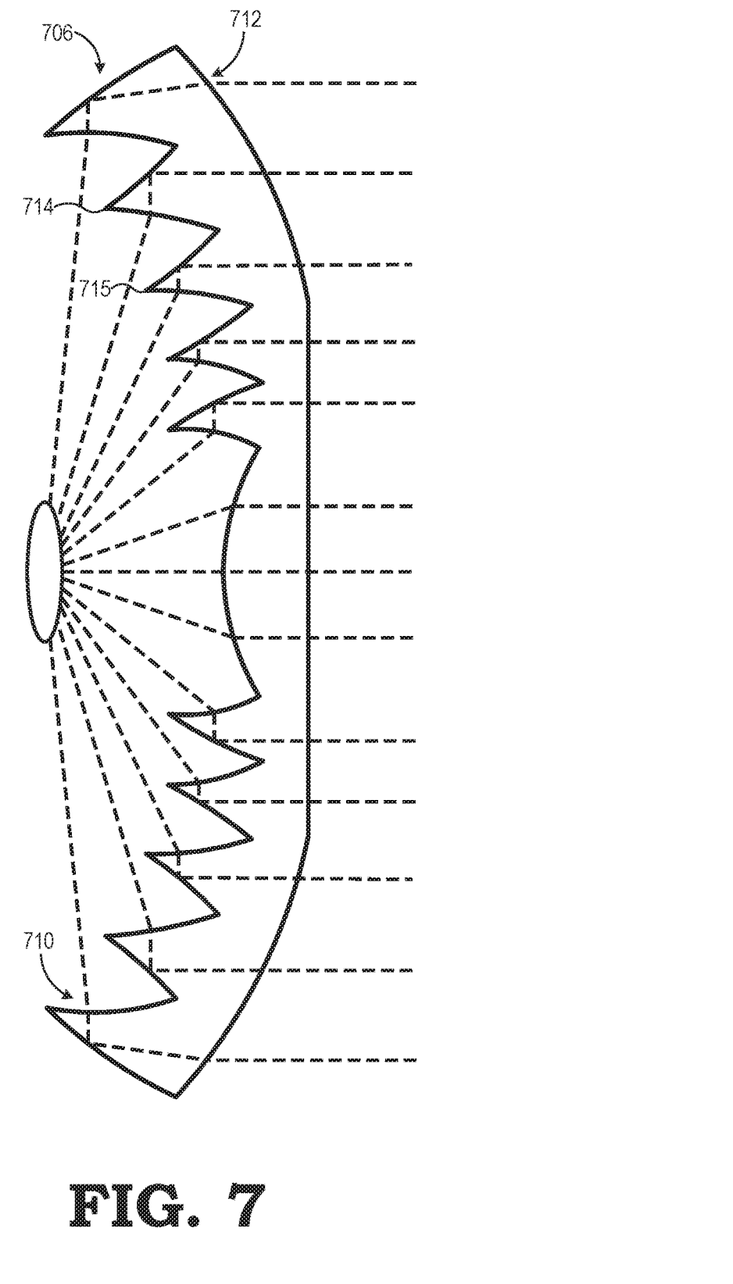
FIG. 7 is a cross-section view diagram of a lens assembly employing a positive continuous aspheric surface and an opposing Fresnel surface with elongated prisms providing total internal reflection (TIR) effects in accordance with some embodiments.

FIG. 7 illustrates another example of a lens assembly 706 that may be implemented in the near-eye display system 100 in place of the multiple Fresnel surface lens assembly 106 in accordance with some embodiments. In the depicted example, the lens assembly 706 comprises a lens having a surface 710 facing the user's eye 104 and having a generally concave (or negative) aspheric profile with Fresnel prisms (e.g., prisms 714, 715) disposed thereon, and a surface 712 facing the display panel 102 and having a positive continuous aspheric profile devoid of Fresnel prisms. As shown, the Fresnel prisms of the surface 710 have elongated profiles so as to present both reflective and refractive surfaces to light propagating from the surface 712 to the surface 710, thereby providing a total internal reflection (TIR) effect for incident light. So implemented, the display-side surface 712 is refractive and induces a negative field-curvature, whereas the eye-side surface 710 is reflective and induces a positive field curvature. Accordingly, if one were to trace a ray from the display to the eye, the refractive surface is the first surface encountered, and the reflective is the second, and thus providing the balanced field curvature effect described herein.

Figure 8:
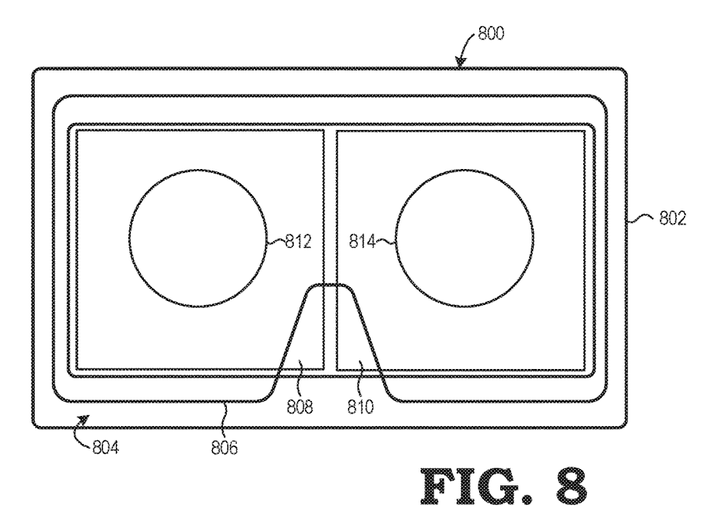
FIG. 8 is a diagram illustrating a rear view of a head mounted display (HMD) device implementing lens assemblies with balanced field curvatures in accordance with at least one embodiment of the present disclosure.

FIG. 8 illustrates an example HMD device 800 configured to implement the near-eye display system 100 in accordance with at least one embodiment. The HMD device 800 is mounted to the head of the user through the use of an apparatus strapped to, or otherwise mounted on, the user's head such that the HMD device 800 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head moves. In such instances, a hand-held device operated in this manner also may be considered an implementation of the HMD device 800 even though it is not "mounted" via a physical attachment to the user's head.

The HMD device 800 comprises a housing 802 having a surface 804, and a face gasket 806 and set of straps or a harness (omitted from FIG. 8 for clarity) to mount the housing 802 on the user's head so that the user faces the surface 804 of the housing 802. In the depicted embodiment, the HMD device 800 is a binocular HMD and thus has a left-eye display panel 808 and a right-eye display panel 810 disposed at the surface 804 (with displays panels 808, 810 collectively or separately representing an embodiment of the display panel 102). The display panels 808, 810 may be implemented as separate display panels (that is independent display arrays driven by separate display driver hardware components) or the display panels 808, 810 may be implemented as logically-separated regions of a single display panel (e.g., a single display array logically divided into left and right "halves"). The housing 802 further includes an eyepiece lens assembly 812 aligned with the left-eye display panel 808 and an eyepiece lens assembly 814 aligned with the right-eye display panel 810. Alternatively, in some embodiments, the HMD device 800 may be implemented as a monocular HMD in that a single image is presented to both eyes of the user, either through left and right eyepiece lens assemblies 812, 814, or directly without an intervening lens. The lens assemblies 812, 814 each may implement any of the lens assemblies disclosed herein, such as lens assembly 106, 606, 706, or combinations thereof. Thus, the lens assemblies 812, 814 may exhibit net field curvatures that are well matched to the display panels 808, 810, which may be substantially flat or curved. Accordingly, the HMD device 800 may exhibit reduced focus aberrations and other aberrations that otherwise would be present in HMD implementations utilizing conventional aspheric lenses with pronounced excessive field curvature.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a lens assembly comprising a lens body having opposing first and second surfaces;
wherein:
the first surface comprises Fresnel prisms optically oriented in a first direction parallel to an optical axis of the lens body;
the Fresnel prisms of the first surface introduce a first field curvature in a first dimension and a second dimension relative to the optical axis, the first dimension and the second dimension being orthogonal to each other;
the second surface comprises Fresnel prisms optically oriented in a second direction parallel to the optical axis of the lens body and opposite the first direction;
the Fresnel prisms of the second surface introduce a second field curvature in the first dimension and the second dimension to produce a net field curvature; and
the lens body has a planar profile relative to an axis of the lens body orthogonal to the optical axis.

2. The apparatus of claim 1, wherein:
the first and second directions extend outward from the lens body.

3. The apparatus of claim 1, wherein the net field curvature in the first direction is greater than the field curvature in the second direction.

4. The apparatus of claim 1, wherein the net field curvature in the first direction is substantially equal to the field curvature in the second direction.

5. The apparatus of claim 1, wherein:
at least one parameter for the Fresnel prisms at the first surface differs from at least one corresponding parameter for the Fresnel prisms at the second surface.

6. The apparatus of claim 5, wherein:
the at least one parameter for the Fresnel prisms of the first and second surfaces is selected so as to provide a specified net field curvature.

7. The apparatus of claim 1, further comprising:
a head mounted display device comprising:
a display panel; and
the lens assembly mounted so that an optical axis of the lens assembly intersects the display panel.

8. The apparatus of claim 1, wherein:
a design parameter for each of the Fresnel prisms of the first surface and a design parameter for each of the Fresnel prisms of the second surface are selected so that the net field curvature matches a curvature of a display panel aligned for view with the lens body.

9. An apparatus comprising:
a lens assembly comprising a lens body having opposing first and second surfaces;
wherein:
the first surface comprises Fresnel prisms optically oriented in a first direction parallel to an optical axis of the lens body;
the Fresnel prisms of the first surface introduce a first field curvature in a first dimension and a second dimension relative to the optical axis, the first dimension and the second dimension being orthogonal to each other;
the second surface comprises Fresnel prisms optically oriented in a second direction parallel to the optical axis of the lens body and opposite the first direction;
the Fresnel prisms of the second surface introduce a second field curvature in the first dimension and the second dimension to produce a net field curvature; and
the first and second directions extend into the lens body.

10. The apparatus of claim 9, wherein the lens body has a curved profile relative to an axis of the lens body orthogonal to the optical axis.

11. The apparatus of claim 9, further comprising:
a head mounted display device comprising:
a display panel; and
the lens assembly mounted so that an optical axis of the lens assembly intersects the display panel.

12. An apparatus comprising:
a lens assembly comprising a lens body having opposing first and second surfaces;
wherein:
the first surface comprises Fresnel prisms optically oriented in a first direction parallel to an optical axis of the lens body;
the Fresnel prisms of the first surface introduce a first field curvature in a first dimension and a second dimension relative to the optical axis, the first dimension and the second dimension being orthogonal to each other;
the second surface comprises Fresnel prisms optically oriented in a second direction parallel to the optical axis of the lens body and opposite the first direction;
the Fresnel prisms of the second surface introduce a second field curvature in the first dimension and the second dimension to produce a net field curvature; and
the lens body comprises:
a first Fresnel lens comprising the Fresnel prisms of the first surface; and
a second Fresnel lens comprising the Fresnel prisms of the second surface; and
optical adhesive joining a surface of the first Fresnel lens to a surface of the second Fresnel lens.

13. The apparatus of claim 12, further comprising:
a head mounted display device comprising:
a display panel; and
the lens assembly mounted so that an optical axis of the lens assembly intersects the display panel.

14. An apparatus comprising:
an aspheric lens body having first and second opposing surfaces;
wherein the first surface is generally convex in a first dimension and a second dimension relative to an optical axis of the lens body, the first dimension and the second dimension being orthogonal to the optical axis, and comprises Fresnel prisms; and
wherein the second surface defines a continuously convex aspheric profile devoid of Fresnel prisms along the first dimension and the second dimension.

15. The apparatus of claim 14, wherein:
the Fresnel prisms have an elongated profile relative to the first surface so as to present both reflective and refractive surfaces in at least one of the first dimension and the second dimension to light propagating from the second surface to the first surface.

16. The apparatus of claim 14, wherein:
the Fresnel prisms are oriented in at least one of the first dimension and the second dimension and extending outward from the first surface.

17. The apparatus of claim 14, wherein:
the Fresnel prisms of the first surface introduce field curvature in a first direction relative to the lens body; and
the convex aspheric profile introduces field curvature in a second direction relative to the lens body and opposite the first direction.

18. The apparatus of claim 17, wherein the field curvature in the first direction is greater than the field curvature in the second direction.

19. The apparatus of claim 17, wherein the field curvature in the first direction is substantially equal to the field curvature in the second direction.

20. The apparatus of claim 14, further comprising:
a head mounted display device comprising:
a display panel; and
the aspheric lens body mounted so that an optical axis of the ashperic lens body intersects the display panel.

21. An apparatus comprising:
a lens assembly comprising:
a first lens body having opposing first and second surfaces, wherein:
the first surface comprises Fresnel prisms optically oriented in a first direction parallel to an optical axis of the first lens body;
the Fresnel prisms of the first surface introduce a first field curvature in a first dimension and a second dimension relative to the optical axis, the first dimension and the second dimension being orthogonal to each other;
the second surface comprises Fresnel prisms optically oriented in a second direction parallel to the optical axis of the first lens body and opposite the first direction;
the Fresnel prisms of the second surface introduce a second field curvature in the first dimension and the second dimension to produce a net field curvature; and
a second lens body comprising a third surface, the third surface substantially parallel to the first and second surfaces, the third surface comprising Fresnel prisms oriented in one of the first direction or the second direction.

22. The apparatus of claim 21, further comprising:
a head mounted display device comprising:
a display panel; and
the lens assembly mounted so that an optical axis of the lens assembly intersects the display panel.

* * * * *